United States Patent [19]
Zuber

[11] 3,863,985
[45] Feb. 4, 1975

[54] OFFAL CART

[76] Inventor: Chauncey E. Zuber, c/o E. F. Zuber Engineering & Sales Co., 800 W. 79th St., Bloomington, Minn. 55420

[22] Filed: July 9, 1973

[21] Appl. No.: 377,637

[52] U.S. Cl.......................... 298/2, 298/11, 214/314
[51] Int. Cl............................................. B62b 1/00
[58] Field of Search................ 298/2, 11, 10, 22 R; 214/312, 314, 315, 390; 92/110, 117

[56] References Cited
UNITED STATES PATENTS

| | | | |
|---|---|---|---|
| 1,465,278 | 8/1923 | Melchior............................ | 92/110 X |
| 1,542,877 | 6/1925 | Harman.................................. | 298/2 |
| 2,203,059 | 6/1940 | Palm..................................... | 298/11 |
| 2,429,723 | 10/1947 | Kelley................................... | 298/11 |
| 3,685,674 | 8/1972 | Bruer.................................... | 298/11 |

Primary Examiner—Allen N. Knowles

[57] ABSTRACT

A cart for reception of viscera and other offal for inspection and handling in small slaughtering plants. The tray of the offal cart is positionable in either of two positions. When lowered, it may be positioned under a hanging carcass for collection of offal in the tray. The tray may then be elevated for easy viscera inspection and removal of edible parts, after which the cart can be moved with the tray in raised position for easy removal of the contents of the tray into barrels or other containers for disposal.

11 Claims, 5 Drawing Figures

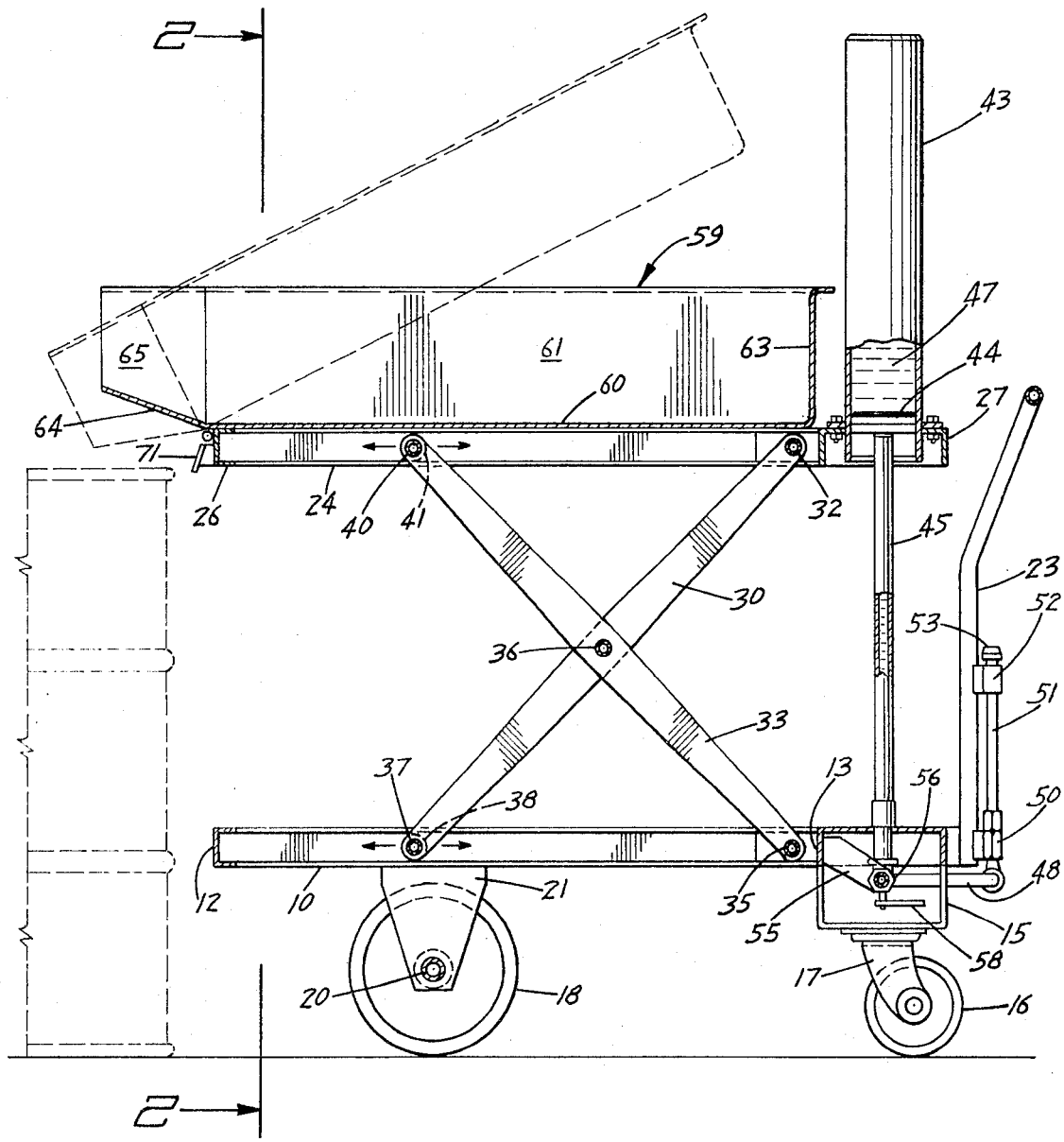

PATENTED FEB 4 1975 3,863,985
SHEET 2 OF 2
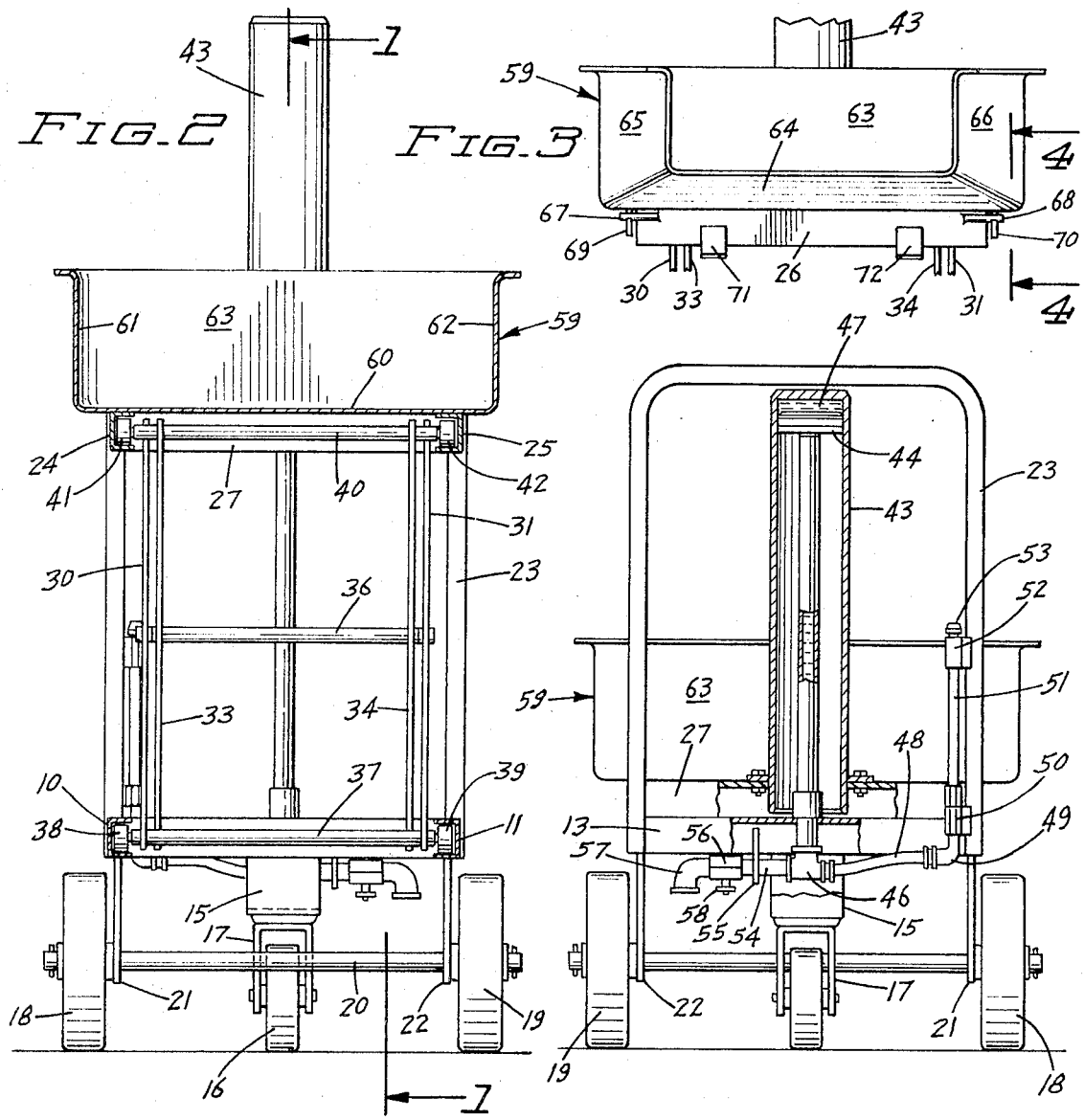
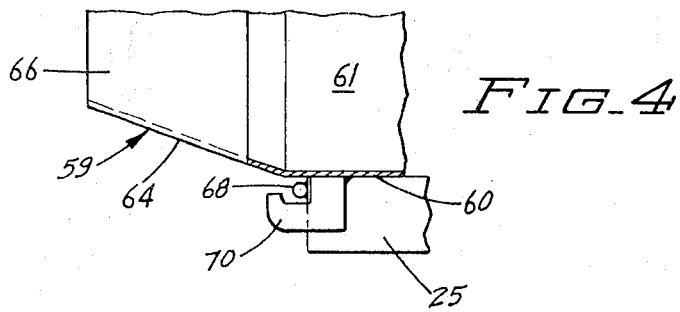

3,863,985

OFFAL CART

This invention relates to an offal cart for receiving viscera and other offal for convenient inspection and handling in small livestock slaughtering plants. The cart includes a tray adapted to receive and discharge the offal. The tray is positionable in either upper or lower positions. With the tray in the lower position, the lower cart can be positioned under a hanging carcass for easy reception of offal. After the carcass is eviscerated and the offal is collected in the cart, the cart can be rolled to another area and the tray elevated for easy inspection of the viscera and removal of edible parts. Then the cart can be moved in the raised position to another area and its contents easily emptied into a barrel or other container for disposal.

The offal cart of the present invention is illustrated in the accompanying drawings in which:

FIG. 1 is an elevation in partial longitudinal section taken along the line 1—1 of FIG. 2 and in the direction of the arrows showing the cart with tray in elevated position;

FIG. 2 is a front end elevation in partial transverse section along the line 2—2 of FIG. 1 and in the direction of the arrows;

FIG. 3 is a fragmentary front elevation of the tray portion of the cart showing means of attachment of the tray to the cart frame;

FIG. 4 is an enlarged fragmentary section on the line 4—4 of FIG. 3 showing in greater detail the means by which the tray is attached to the cart frame; and FIG. 5 is a rear end elevation in partial transverse section showing the cart with tray in lowered position and showing details of the tray elevating means.

Referring now to the drawings, the offal cart according to the present invention comprises a lower rectangular frame including a pair of parallel spaced apart longitudinally extending side channel members 10 and 11 interconnected by parallel spaced apart front and rear members 12 and 13, respectively. Rear cross member 13 is desirably a relatively wide horizontally disposed channel member. A rigid open sided box-like member 15 is disposed between the front and back edges of rear cross member 13 extending downwardly therefrom and centrally disposed between side channels 10 and 11. A rear wheel 16 is journaled for rotation on a shaft extending between the arms of a swivel mount 17 supported from the bottom wall of box member 15. A pair of front wheels 18 and 19 are journaled for rotation on a transverse shaft 20 supported in brackets 21 and 22 extending downwardly from side channel members 10 and 11, respectively, adjacent the front end of the lower frame. Thus the lower frame is supported by wheels 16, 18 and 19. An upwardly extending inverted U-shaped handle 23 is secured at its free ends to the rearward end of the lower frame.

The cart likewise includes an upper frame including parallel spaced apart side channel members 24 and 25 connected adjacent their front and rear ends by cross members 26 and 27, respectively. The upper and lower frames are of generally the same size and rectangular configuration and the upper frame lies directly above the lower frame.

The upper frame is supported so as to be elevated relative to the lower frame by means of a scissors arrangement. The scissors mounting includes a pair of outer members 30 and 31 secured at their upper ends to transverse shaft 32 whose ends are carried between upper side channel members 24 and 25 just forward of the front edge of rear cross member 27 for limited pivotal rotation. A pair of inner scissors members 33 and 34 are similarly mounted at their lower ends for limited pivotal rotation with transverse shaft 35 whose ends are supported in lower frame side channel side members 10 and 11 just forward of the front edge of rear cross member 13. At their point of crossing, midway between the ends thereof, scissors members 30, 31, 33 and 34 are connected for limited rotational movement with respect thereto to transverse shaft 36. Outer scissors members 30 and 31 and inner scissors members 33 and 34, being parallel to each other, move together and one outer scissors member and one inner scissors member of each pair move relative to one another in limited rotational movement.

The forward ends of outer scissors members 30 and 31 are connected for limited pivotal rotation to shaft 37 whose ends are carried by rollers 38 and 39 fitted to rotate and travel in limited longitudinal movement in lower frame side channel members 10 and 11, respectively. The forward ends of inner scissors members 33 and 34 are similarly connected for limited pivotal rotation to transverse shaft 40 whose ends are carried in rollers 41 and 42 for rotation and travel in upper frame side channel members 24 and 25, respectively.

The position of shafts 32 and 35, and accordingly the rearward ends of scissors members 30, 31, 33 and 34 are fixed relative to the upper and lower frame members whereas the forward ends of the scissors members, by virtue of their roller mounting within the frame side channels, are longitudinally movable relative to the rearward ends. Thus, it is readily seen that, as the rollers 38, 39, 41 and 42 move in unison longitudinally of their respective frames, forwardly or backwardly, the upper frame is lowered or elevated, and vice versa.

The means for elevating the upper frame relative to the lower frame is as follows: A vertically disposed cylinder 43 is mounted to the top surface of upper frame rear cross member 27, centrally disposed between the side frame members. The length of cylinder 43 is approximately the distance the upper frame may be moved. A gasketed piston 44 is fitted within cylinder 43 for reciprocal movement relative to the cylinder. Piston 44 is carried by one end of a fixed hollow piston rod 45 whose other end is connected in piston rod tee coupling 46 within box member 15. Hollow piston rod 45 extends through piston 44. It will thus be seen that, as fluid is introduced through hollow piston rod 45 into the space 47 between the piston 44 and the upper end of cylinder 43 (FIG. 5), because the piston rod is fixed against movement, cylinder 43 is elevated relative to the piston 44, and, because of its attachment to the upper frame, elevates that frame. As the upper frame elevates, the scissors members open from their parallel side-by-side lower position into their open position, as seen in FIG. 1, the relatively movable ends of the scissors members being guided by the rollers moving in their respective channels.

One side of piston rod coupling 46 is connected through a length of tubing 48 with appropriate end fittings to an elbow 49 at the rearward end of the lower frame adjacent one side of handle 23. A one-way check valve permitting flow only in the direction through elbow 49 to piston rod coupling 46 is connected to the opposite side of elbow 49. A length of tubing 51 extends vertically alongside one arm of handle 23 held in bracket 52 attached to the handle. The free end of tube 51 is provided with a fitting 53 for attachment to an available supply source of fluid pressure. In a slaughter house this is conveniently water pressure supplied through a hose.

Although any hose fitting may be used, preferably fitting 52 is of the type adapted to mate with a pistol grip hose nozzle having a resilient rubber ring around its discharge (such as the Strahman automatic water-saver spray nozzle) such that the nozzle can be merely held by hand pressure to force water into fitting 52 and thence through tube 51, check valve 50, elbow 49, tubing 48, tee coupling 46 and piston 45 into cylinder chamber 47 ahead of piston 44 to expand within the cylinder chamber and raise the cylinder and upper frame.

In order to lower the frame by draining the water from the cylinder, the opposite side of piston rod coupling 46 is connected through a nipple 54 supported in a bracket 55 which extends rearwardly and downwardly from lower frame rear cross member 13. The opposite end of nipple 55 is connected to discharge valve 56. A downwardly directed elbow 57 is desirably connected to the discharge valve so as to direct the discharged water to the floor. Discharge valve 56 is desirably provided with an elongated bar handle 58 permitting operation of the valve with a foot.

A relatively deep and generally rectangular offal tray 59 is supported on top of the upper frame of the cart. Tray 59 comprises generally a bottom wall 60, spaced apart parallel and vertically extending side walls 61 and 62 and vertically extending end wall 63. The front end of the tray is open. The forward end 64 of bottom wall 60 and the forward ends 65 and 66 of tray side walls 61 and 62, respectively, converge slightly to the open end of the tray, which is of smaller area than rear tray wall 63, as best seen in FIG. 3, to form a pouring spout or discharge chute for the tray. As shown in broken lines in FIG. 1, tray 59 is pivotally mounted to facilitate emptying, as into a barrel or similar vessel. That spout-like portion of the tray 59 extends forwardly of the forward end member 26 of the upper cart frame.

Tray 59 is pivotally attached to the upper cart frame as follows: A pair of roll pins 67 and 68 are welded or otherwise secured to the top edge of upper frame front cross member 26 adjacent the ends thereof and projecting beyond the ends. A pair of hook members 69 and 70 are welded or otherwise secured to the bottom surface of tray bottom wall 60 adjacent upwardly extending portion 64. Hook members 69 and 70 are parallel and spaced apart sufficiently to extend downwardly parallel to the outside walls of upper frame side channel members 24 and 25, respectively. Hook members 69 and 70 extend forwardly and are adapted to engage roll pins 67 and 68, respectively.

As seen in broken lines in FIG. 1, tray 59 is readily raised so as to empty its contents. A pair of stop members mounted on front top frame cross member 26 limits pivotal movement of tray 59 to about 90°. Both the tray and frame may be easily cleaned with the tray in forward tilted position.

Although size is not a feature of the invention, exemplary dimensions include the following: The overall cart may be about 54 inches long by 26 inches wide. When the tray is in its lower position, bottom wall 60 is only 15 inches above the floor, low enough for easy positioning under a hanging carcass. The cart is 45 inches high when raised. The tray lip is then 37 inches above the floor to clear the top of a 55 gallon drum. The front wheels are 10 inches in diameter. The rear swivel wheel is 6 inches in diameter. The cart is desirably formed from stainless steel for easy maintenance and sanitation.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A cart for reception of offal from slaughtered livestock animals, which cart comprises:
   A. a lower frame comprising at least a pair of parallel spaced apart longitudinal members interconnected by at least a pair of forward and rearward parallel spaced apart transverse members,
   B. wheel means supporting said lower frame for movement,
   C. an upper frame of construction corresponding to said lower frame and overlying said lower frame,
   D. means for vertically raising and lowering said upper frame relative to said lower frame, and
   F. an offal receiving tray supported on said upper frame, said offal receiving tray being open at one end and pivotally attached to said upper frame adjacent to that end.

2. A cart according to claim 1 further characterized in that said offal receiving tray includes a bottom wall, side walls and rear wall, said bottom wall and side walls adjacent said open end converging toward that open end.

3. A cart according to claim 1 further characterized in that said offal receiving tray is removably attached to said upper frame.

4. A cart according to claim 1 further characterized in that said means adjustably connecting said upper and lower frames comprises:
   A. a plurality of elongated scissors members,
   B. at least two of said scissors members being parallel and spaced apart, the upper ends of said members being secured to the opposite sides of the upper frame for limited rotational movement relative thereto, and the lower ends of said members being secured to the opposite sides of the lower frame for limited longitudinal movement relative thereto,
   C. a least two more of said scissors members being parallel and spaced apart, the lower ends of said members being secured to the opposite sides of the lower frame for limited rotational movement relative thereto, and the upper ends of said members being secured to the opposite sides of the upper frame for limited longitudinal movement relative thereto, and
   D. adjacent scissors members being secured together at their mid-points for limited rotational movement relative to each other.

5. A cart according to claim 4 further characterized in that:
   A. longitudinal channel members are disposed on opposite sides of said upper and lower frames,
   B. rollers are journaled for rotation at the longitudinally movable ends of said scissors members, and C. said rollers are seated in said channels for limited movement therein.

6. A cart according to claim 1 further characterized in that said means for raising and lowering said upper frame comprises:

A. an hydraulic cylinder mounted on the upper side of side upper frame adjacent the rear end thereof, B. a piston in said cylinder, the rod of said piston being hollow and the end thereof fixed relative to said lower frame, C. means for introducing an hydraulic fluid to said cylinder through said piston rod, and D. means for discharging said fluid.

7. A cart according to claim 6 further characterized in that said means for introducing and discharging fluid comprises:

A. a tee coupling connected to the hollow piston rod,

B. a fluid flow line connected to one side of said tee coupling including a check valve and a fitting adapted for engagement with a water hose, and C. a further fluid flow line connected to the other side of said coupling and including a discharge valve.

8. A cart according to claim 5 further characterized in that said rollers are journaled for rotation at the opposite ends of parallel transverse shafts extending between the corresponding ends of said scissors members, and other transverse parallel shafts extend between the opposite ends and midpoints of said scissors members.

9. A cart for reception of offal from slaughtered livestock animals, said cart comprising:

A. a lower rectangular frame,

B. wheel means supporting said lower frame for movement,

C. an upper rectangular frame overlying said lower frame and adjustably connected thereto, D. longitudinal channel members disposed on opposite sides of said frames, E. a pair of scissors members interconnecting said upper and lower frames on the opposite sides thereof, one end of each of said scissors members being secured to one of said frames for limited rotational movement relative thereto, the opposite end of each of said scissors members carrying a roller positioned in the longitudinal channel of the other frame member for limited movement therein, F. an offal receiving tray supported on said upper frame, said offal receiving tray being open at one end and pivotally and removably attached to said upper frame adjacent the open end, G. an hydraulic cylinder mounted on the upper side of said upper frame adjacent the rear end thereof, H. a piston in said cylinder, the rod of said piston being hollow and the end thereof fixed relative to said lower frame, I. means for introducing an hydraulic fluid to said cylinder through said piston rod, and J. means for discharging said fluid.

10. A cart according to claim 9 further characterized in that said means for introducing and discharging fluid comprises:

A. a tee coupling connected to the hollow piston rod,

B. a fluid flow line connected to one side of said tee coupling including a check valve and a fitting adapted for engagement with a water hose, and C. a further fluid flow line connected to the other side of said coupling and including a discharge valve.

11. A cart according to claim 9 further characterized in that said rollers are journaled for rotation at the opposite ends of parallel transverse shafts extending between the corresponding ends of said scissors members, and other transverse parallel shafts extend between the opposite ends and midpoints of said scissors members.

* * * * *

PO-1050
(5/69)

UNITED STATES PATENT OFFICE
CERTIFICATE OF CORRECTION

Patent No. 3,863,985          Dated February 4, 1975

Inventor(s) Chauncey E. Zuber

It is certified that error appears in the above-identified patent and that said Letters Patent are hereby corrected as shown below:

Claim 1, after subparagraph C, the following paragraph is omitted:

-- D) means adjustably connecting said upper and lower frames, --

Claim 1, the subparagraph numbered "D" should be --E--.

Claim 6, subparagraph A, line 2, "side" should be --said--.

Signed and sealed this 15th day of April 1975.

(SEAL)
Attest:

RUTH C. MASON
Attesting Officer

C. MARSHALL DANN
Commissioner of Patents
and Trademarks